United States Patent [19]  [11] 4,100,602
Shapiro  [45] Jul. 11, 1978

[54] RECIPE CONVERSION CALCULATOR

[75] Inventor: Ascher H. Shapiro, Jamaica Plain, Mass.

[73] Assignee: Massachusetts Institute of Technology, Cambridge, Mass.

[21] Appl. No.: 740,638

[22] Filed: Nov. 10, 1976

[51] Int. Cl.² .............................................. G06F 5/00
[52] U.S. Cl. .................................... 364/715; 235/310
[58] Field of Search .................... 235/156, 89 R, 61 R

[56] References Cited
U.S. PATENT DOCUMENTS 3,436,012  4/1969  Stephenson ................. 235/89 R X
3,973,113  8/1976  Goldsamt ............................ 235/156

Primary Examiner—Thomas J. Sloyan
Attorney, Agent, or Firm—Arthur A. Smith, Jr.; Paul J. Cook; Allen D. Brufsky

[57] ABSTRACT

To permit a cook to easily adapt an existing recipe, a calculator includes logic circuitry for calculating and storing the ratio of servings desired to servings stated in the recipe. The calculator also includes a keyboard for entering the quantity of each ingredient stated in the recipe. Desired units of measure and stated units of measure can be entered through marked keys. The calculator converts a stated quantity in the stated units to the amount required for the desired number of servings in the desired units of measure. The results are displayed on a visual display.

7 Claims, 4 Drawing Figures

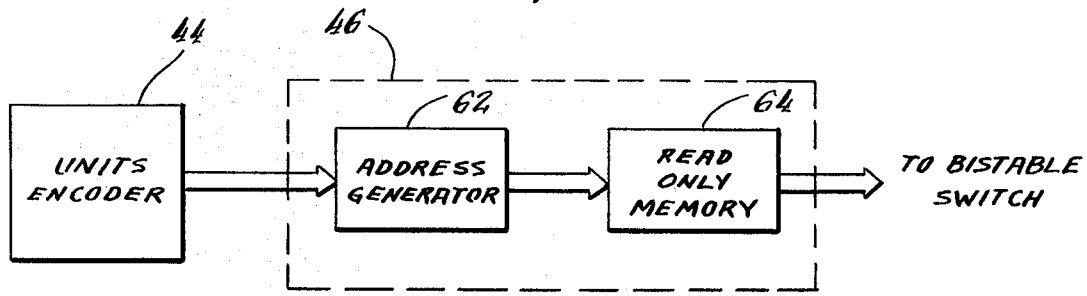
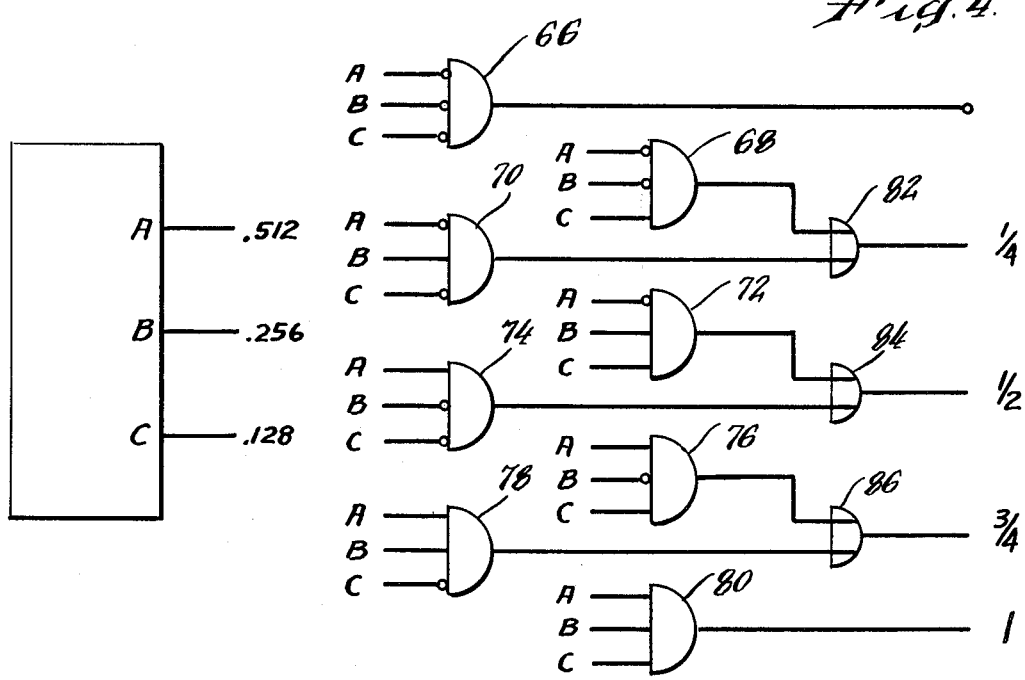

RECIPE CONVERSION CALCULATOR

BACKGROUND OF THE INVENTION

The present invention relates to calculators and more particularly to a recipe conversion calculator.

A universal and long standing complaint of most cooks is that recipes always seem to be for a number of servings different from the number of servings the cook desires to prepare. Heretofore, the cook has faced the undesirable alternatives of either preparing the recipe as stated or of working through the arithmetic of converting from the stated quantity for each ingredient to the quantity needed for the number of servings desired.

Also, cookbooks are invariably written with local units of measure. For example, American cookbooks call for measurements in terms such as tablespoons, cups, pints, quarts or gallons while European cookbooks may express similar volumes in terms of cubic centimeters or liters. A cook familiar with only one of the systems of measure has a great deal of difficulty in utilizing a recipe written with different units of measure.

Even where the recipe is written with units of measure with which the cook is quite familiar, a cook may find the recipe expresses a quantity of an ingredient in a unit measure for which the cook can find no measuring utensil. For example, the recipe may call for a certain number of quarts of a particular ingredient while the cook can only find a cup-sized measuring utensil. Heretofore, any cook who had not committed the necessary conversion factors to memory, was forced to make a calculation, using a printed conversion table in order to determine the number of cups per quart.

Naturally, errors in performing the required calculations have led to errors in the quantities actually used in preparing recipes with, at times, consequent culinary disaster.

SUMMARY OF THE INVENTION

The present invention is a calculator which greatly simplifies and automates the task of converting recipes to a desired number of servings and from one unit of measure to another. The calculator is so designed, and the punch keys are so arranged with appropriate instructions on the keyboard, that no knowledge of mathematics is required, nor of conversion factors. The user is led step-by-step through the necessary keyboard operations.

The calculator includes means for entering the desired number of servings and the stated number of servings and means for establishing the ratio of the two quantities. Also included are means for entering a stated amount, a stated unit of measure and a desired unit of measure for each ingredient in the recipe. The calculator includes means for establishing the ratio of the desired units of measure to the stated units of measure. Means are included for multiplying the servings ratio, the stated amount of an ingredient and the units ratio for that ingredient to provide a signal representing the correct amount of the ingredient for the desired number of servings in the desired units of measure. The calculator further includes a display means for providing a visual representation of the last-mentioned signal.

DESCRIPTION OF THE DRAWINGS

While the specification concludes with claims particularly pointing out and distinctly claiming that which is regarded as the present invention, further details of one embodiment of the invention may be more readily ascertained from the following detailed description when read in conjunction with the accompanying drawings wherein:

FIG. 3 is a block diagram of the circuitry required for converting units to multiples of a common base unit; and FIG. 4 is a logic diagram of circuitry required to round decimal fractional amounts to integer fractions.

DETAILED DESCRIPTION

Figure 1:
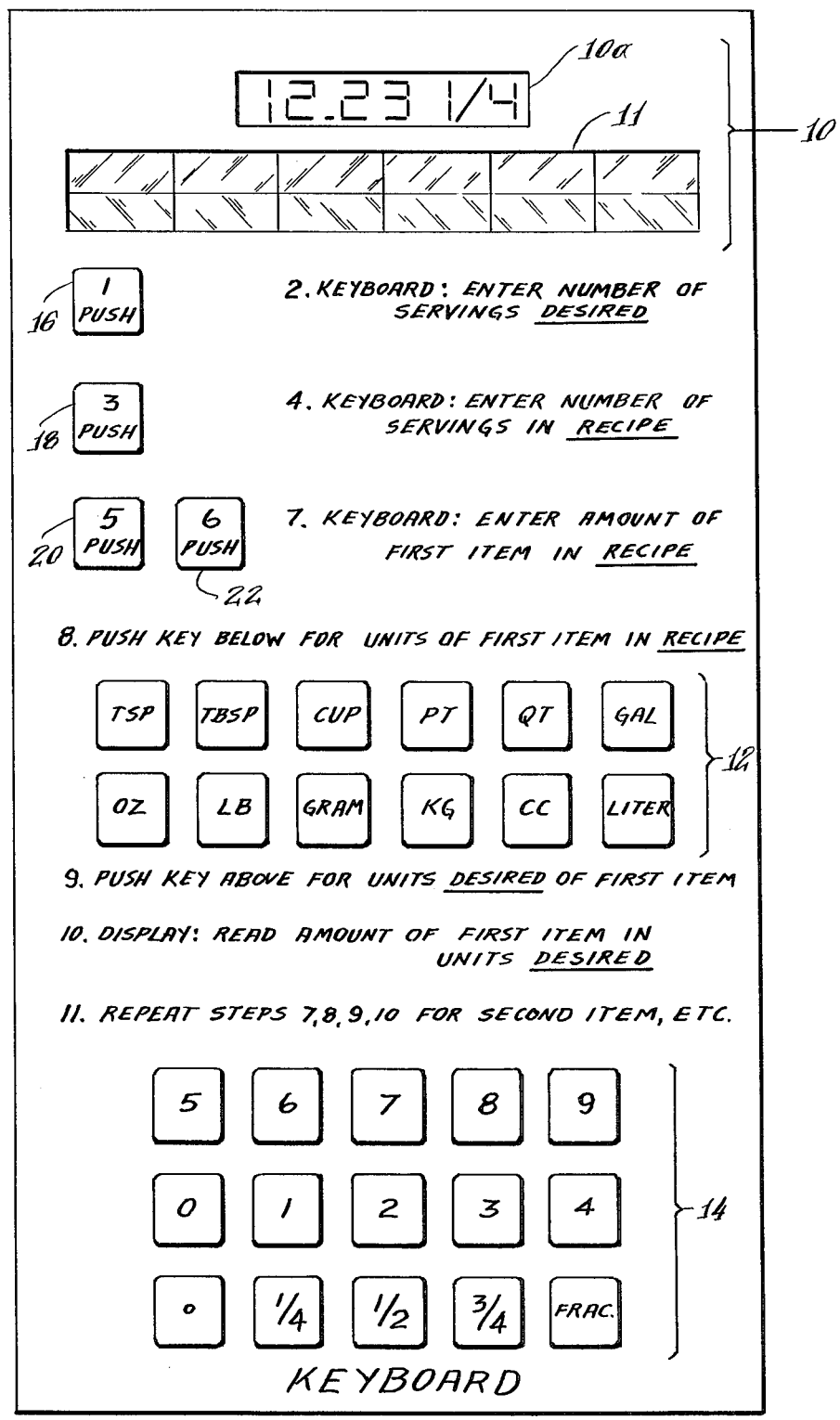
FIG. 1 is a plan view of a recipe conversion calculator, illustrating the type of instructions a cook must follow in using the calculator.

Referring to FIG. 1, a calculator incorporating the present invention is designed to be simple to use. The final results of any calculation and certain intermediate results can be viewed on a visual display 10 capable of displaying both integers, fractions and abbreviations for units of measure. While integers and fractions may be displayed readily using conventional segmented display elements, such elements can form few alphabet characters. For that reason, the units section of display 10 may be a conventional panel 11 with units markings which can be separately back-lighted.

The calculator includes a units keyboard 12 having a number of pushbuttons, each of which is marked with a particular unit of measure, such a oz, gm, gal, in either the English or metric systems of measurement. A numerical entry keyboard 14 is provided to permit a user to enter quantities of ingredients in a recipe. Keyboard 14 differs from conventional keyboards in that it includes keys marked ¼, ½, ¾ permitting a user to quickly and easily enter fractional amounts which sometimes appear in recipes. Keyboard 14 also includes a FRACT. key, the function of which is explained below. Interspersed with display 10, units keyboard 12 and keyboard 14 are a number of other buttons 16, 18, 20, 22 and a series of written instructions. The buttons 16, 18, 20 and 22, and the written instructions are identified by the numerical sequence 1, 2, 3. . . 11, in a color code which may, for the sake of clarity, be different from that on the buttons of keyboard 14. The numerical sequence provides the step-by-step guide to the user for the operations to be performed. A cook using the calculator simply performs in order each of the steps called for in the numerical sequence appearing on the face of the machine. The results of each step are discussed generally below and in more detail in a subsequent discussion of the internal circuitry of the calculator.

The first step in using the calculator is to depress key 16, which results in a clearing of the visual display and all internal memories and registers other than permanent or non-erasable mrmories. The second step is to key in the desired number of servings through keyboard 14. When the desired number of servings has been entered, the third step is to depress button 18, which causes the entered number to be shifted to a divider circuit within the machine. In the fourth step, the number of servings specified in the recipe is entered through keyboard 14. The fifth step, depressing button 20, causes the number entered in step four to be transferred to the divider circuit where the ratio of the number of servings desired to the number of servings specified in the recipe can be calculated. When, in the sixth step, button 22 is depressed, this ratio, referred to as the servings ratio, is transferred out of the divider circuit to a ratio register.

In step seven, keyboard 14 is employed to enter the quantity of the first ingredient as specified in the recipe. In the eighth step, the appropriate button on units keyboard 12 is depressed to enter the unit of measure for the first ingredient in the recipe. In the ninth step, another one of the buttons in units keyboard 12 is depressed to enter the desired units of measure for the first ingredient. If the stated and desired units of measure are the same, then the same button on units keyboard 12 would be pushed for both step eight and step nine.

Upon entry of the desired units of measure, arithmetical operations are performed within the calculator, employing the servings ratio, the entered quantity of the first ingredient, and a ratio of units desired to units specified. The various factors are multiplied to generate a signal which represents the quantity of the first ingredient of the recipe which must be provided in the desired units of measure for the desired number of servings.

After the cook has noted the information displayed, step number eleven instructs the user to repeat steps number seven, eight, nine and 10 for each of the remaining ingredients of the recipe. Since the servings ratio will remain constant, steps one through six need not be repeated. Steps seven through 10 only are repeated for each of the remaining ingredients in the recipe.

The numerical calculations will produce a decimal signal on display 10 indicating the desired quantity. The quantity appearing on display 10 following step nine might appear, for instance, as 12.23 oz. To simplify things as much as possible for a cook, keyboard 14 includes the FRACT. key. When this key is pushed, the fractional portion of this representation (0.23) is rounded generally to the nearest $\frac{1}{4}$ since cooks are more accustomed to working with integer fractions than decimal fractions. The circuitry for performing the necessary operations is described in more detail below.

Figure 2:
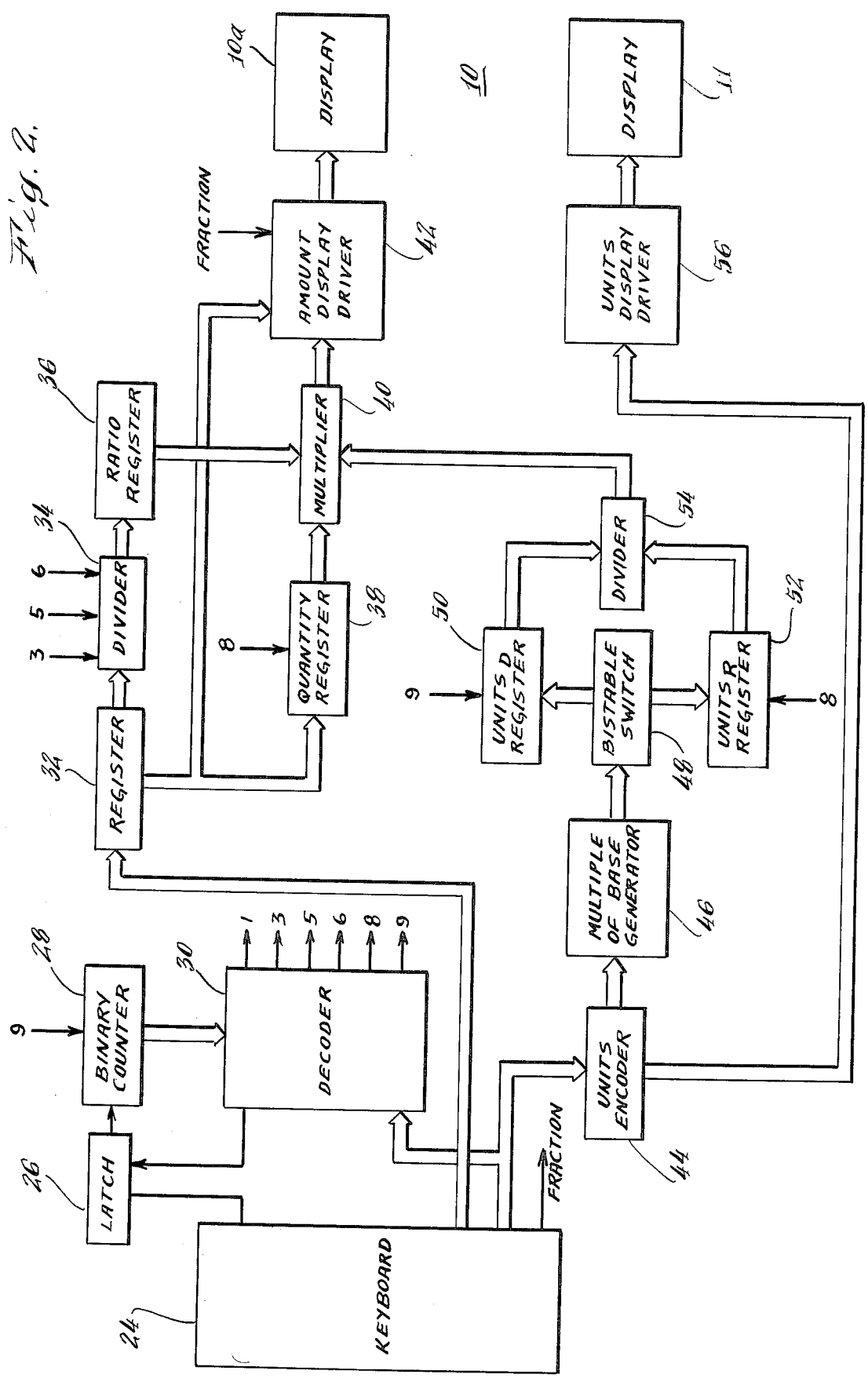
FIG. 2 is a block diagram of logic circuitry for performing the necessary calculations.

Referring to FIG. 2, the various buttons which appear on the face of the calculator are represented only as a keyboard 24. The outputs from all buttons on the keyboard are applied to a latch 26 which provides a single incrementing signal during each step to a binary counter 28, the outputs from which are applied to a decoder 30. A number of numeral-bearing outputs from decoder 30 are illustrated. Each output carries a control signal which is generated at the identically numbered step in the program. These control signals are applied to elements on modules in the circuitry having short numeral-bearing input arrows. Latch 26, binary counter 28 and decoder 30 act as a program counter to provide output pulses which produces the proper flow of data during each step in the operation. The function of latch 26 is to pass the first pulse generated during any step in the process but to block all subsequent pulses during that step. The latch is necessary since certain of the steps, such as the second and fourth step, may require that several numbers be entered during the step. To assure that only one incrementing pulse is applied to binary counter 28 at a time, latch 26 responds to the first entry by applying an incrementing pulse to binary counter 28 but ignores all further entries.

All data entered into the calculator through keyboard 14 is initially stored in the register 32. Any information stored in register 32 is supplied to display driver 42 and appears on display 10. Servings data is transferred during operation of the calculator into a divider circuit 34 where the ratio of the number of servings desired to the number of servings specified in the recipe is calculated and stored in a ratio register 36. Numerical data representing the quantity of an ingredient specified in the recipe is transferred through register 32 to a quantity register 38 having an output to a multiplier circuit 40.

Units of measure information entered through keyboard 12 is applied to decoder 30 and to a units encoder 44. Units encoder 44 accepts the individual pushbutton signals from keyboard 12 and converts or encodes each signal into a unique multi-bit binary word. It is necessary to apply the entered information to the decoder 30 since entry of the information is decoded to initiate certain steps in the calculator. Information initially transferred into unit encoder 44 is applied to units display driver 56 and to a multiple-of-base generator circuit 46 which converts all unit signals of a particular type (weight, volume) to numerical multiples of a common base unit. For example, if the 1*b* key on keyboard 12 is depressed, a signal representing this unit of measure is applied to circuit 46 where the 1*b*. unit might be expressed as a multiple of grams. Circuit 46 would output a numerical signal representing 453.6 which is the approximate number of grams per avoirdupois pound.

The output of circuit 46 is applied to a bistable switch 48 which directs this output to either of two registers 50 or 52. A signal representing the unit of measure actually specified in the recipe is directed to register 52. A signal representing the unit of measure desired is directed to register 50. The outputs of registers 50 and 52 are applied to a divider circuit 54. Divider circuit 54 calculates the ratio of the units of measure specified in the recipe (expressed as a multiple of a common base unit) to the units of measure desired (also expressed as a multiple of a common base unit).

To illustrate the operation of divider circuit 54, assume the recipe had stated pounds as a unit of measure but that the cook desired to use ounces. After step eight, register 52 would contain an electrical representation of the numeral 453.6, the number of grams per pound. After step nine, register 50 would contain an electrical presentation of 28.35, the number of grams per avoirdupois ounce. Divider 54 would divide the contents or register 52 by the contents of register 50 to yield a units ratio of 453.6/28.35 or 16.00.

The output of divider circuit 54 is applied to multiplier circuit 40 which multiplies the servings ratio signal by the signal contained in quantity register 38 and also by the units ratio signal provided by divider circuit 54, thus generating an output signal representing the amount of the ingredient needed for the desired number of servings expressed in the desired units of measure. When this output signal is applied to the quantity display driver 42, a segmented display 10*a* provides visually a numerical representation of the quantity. The desired units of measure are also displayed on a display 11 connected to the output of the units display driver 56.

In the embodiment of FIG. 1, display 11 is a divided panel with units markings in each rectangle which can be separately back-lighted. Alternatively, display 11 can be in the form of individual pilot lights located below each button of units keyboard 12; or display 11 can be the buttons of units keyboard 12 themselves, which are translucent and which are individually back-lighted.

The circuitry described generally above functions in the following manner to perform the necessary calculations. When pushbutton 16 is activated in the first step, the displays 10a and 11, and all non-permanent registers or memory units are cleared. When the cook enters the number of servings desired through keyboard 14, this information is directed to register 32 and thus to display 10a. When pushbutton 18 is depressed in the third step, the information contained in register 32 is shifted into divider circuit 34 under the control of command signal denominated by a small numeral 3 adjacent an arrow leading to divider circuit 34. Register 32 is cleared as the information is shifted to divider 34 and is ready to accept a numerical input representing the number of servings desired. This is the fourth step in the process. In the fifth step, depression of pushbutton 20 causes this information to be shifted from register 32 into divider circuit 34. In the sixth step, the actual division operation is performed producing an output signal representing $S_d/S_r$ where $S_d$ equals the number of servings desired and $S_r$ represents the number of servings specified in the recipe. A numerical representation of $S_d/S_r$ is shifted into servings ratio register 36 in the course of the division process.

When, in the seventh step, the cook enters the quantity of the first ingredient specified in the recipe, this information is also directed into register 32. When, in the eighth step, the units of measure specified for this ingredient are keyed in through keyboard 12, the actuation of one of the keys on keyboard 12 is decoded by decoder 30 to provide a command which transfers the quantity signal from register 32 to the quantity register 38. At the same time, the unit signal is transferred through units encoder 44 and multiple-of-base generator circuit 46 to the bistable switch 48 which, having been cleared, directs the signal to units register 52. When, in the ninth step, another key on keyboard 12 is depressed indicating the desired units of measure, this information is also applied to decoder 30 to derive a command and to shift the desired units signal through units encoder 44, circuit 46 and bistable switch 48 which directs this signal to units register 50. Divider circuit 54 divides the contents of register 52 by the contents of register 50 to produce a $U_r/U_d$ signal where $U_d$ represents the number of common base units contained in one unit of desired measure, and $U_r$ represents the number of common base units contained in one unit of the measure stated in the recipe. As part of the ninth step, multiplier circuit 40 multiplies (quantity stated in recipe) × $(S_d/S_r)$ × $(U_r/U_d)$ to generate the correct quantity of the ingredient for the desired number of servings in the desired units of measure.

Referring to FIG. 3, the multiple-of-base generator 46 includes an address generator 62 which converts the signals received from units encoder 44 to binary words suitable for addressing a permanent storage location in a Read-Only Memory 64. Read-Only Memory 64 is basically a lookup table wherein a numerical quantity is stored for each different button in the keyboard. These numerical quantities are retrieved when addressed by the output of address generator 62 and pass through bistable switch 48 to one of the registers 50 or 52.

Since the quantity signals produced and displayed on display 10a will be expressed in decimal format, such as 12.23, and since most cooks are accustomed to working with integer fractions (e.g., ¼, ½, ¾) rather than decimal fractions, logic circuitry is included for rounding decimal fractions generally to the nearest quarter. Referring to FIG. 4, the circuitry includes a number of AND gates 66, 68, 70, 72, 74, 76, 78 and 80, all of which have inputs from the three most significant bits of the fractional portion of the display. Decoding these three bits in AND gates 66 through 80 (which can handle all combinations of ones and zeros in the three positions) and combining the outputs of certain of the AND gates in OR gates 82, 84, 86 produces output integer fraction signals which may be used to energize segmented elements in the display 58.

Since only the three most significant bits of the decimal fractions are utilized, the rounding is not exact but is sufficiently close. For example, exact rounding to the nearest quarter requires that signals between one eighth or 0.125 and three eighths or 0.375 be interpreted and displayed as one quarter. Using only the three most significant bits of the decimal fraction, any values between 0.128 and 0.383 would be displayed as one quarter. The actual range for the rounding from decimal to integer fractions is set out below.

0 – 0.127 displayed as 0
0.128 – 0.383 displayed as ¼
0.384 – 0.639 displayed as ½
0.640 – 0.895 displayed as ¾
0.896 and above displayed as one.

The display driver 42 would include internal circuitry to round the integer portion of the display 10a to the next highest integer where the rounded decimal fraction would normally be displayed as one.

While there has been described what is considered to be a preferred embodiment of the invention, variations and modifications therein will occur to those skilled in the art once they become familiar with the basic concepts of the invention. Therefore, it is intended that the appended claims shall be construed to include all such variations and modifications as fall within the true spirit and scope of the invention.

What is claimed is:

1. For converting recipes from a given number of servings and given units of measure to a desired number of servings and desired units of measure, a calculator including:
   a control panel having keys and associated indicia describing a series of steps by which the user enters data and control signals into the calculator in a sequence compatible with the dedicated structure thereof, said control panel including
      a numeric keyboard comprising a plurality of individually actuatable keys for entering the desired number of servings, the given number of servings and the given numerical quantity of each ingredient, and
      a keyboard comprising a plurality of individually actuatable keys for entering the given units of measure for each ingredient, each of said keys representing and being labeled with indicia denoting a specific unit of measure;
   divider means for operating upon signals representing the desired number and given number of servings to establish the ratio of the desired number to the given number;
   register means for storing the calculated servings ratio;
   divider means for calculating a conversion factor as a function of desired units and given units of measure;
   means for multiplying the signal representing the given numerical quantity of an ingredient by a signal representing the conversion factor to generate a signal representing the correct numerical amount of the ingredient for the desired number of servings and the desired units of measure; and display means for providing a visual representation of the last-mentioned signal and of the desired units of measure associated therewith.

2. A calculator as recited in claim 1 wherein said means for calculating the conversion factor comprises:

means for converting each unit-representing input signal to an output signal expressing the unit of measure as a multiple of a common base unit; and means for dividing the output signal representing the given unit of measure by the output signal representing the desired unit of measure.

3. A calculator as recited in claim 1 wherein said display means is capable of representing fractional amounts in both integer fractions and decimal fractions.

4. A calculator as recited in claim 2 wherein said display means is capable of representing fractional amounts in both integer fractions and decimal fractions.

5. A calculator as recited in claim 3 further including means for rounding fractional amounts of ingredients expressed in decimal form to integer fraction form.

6. A calculator as recited in claim 4 further including means for rounding fractional amounts of ingredients expressed in decimal form to integer fraction form.

7. A calculator as recited in claim 1 further including indicia providing instructions as to the proper sequence of operating said various means.

* * * * *

UNITED STATES PATENT AND TRADEMARK OFFICE
CERTIFICATE OF CORRECTION

PATENT NO. : 4,100,602
DATED : July 11, 1978
INVENTOR(S) : Ascher H. Shapiro

It is certified that error appears in the above-identified patent and that said Letters Patent are hereby corrected as shown below:

Claim 1, the penultimate paragraph, before "the conversion factor" insert -- the servings ratio and by a signal representing --.

Signed and Sealed this

Tenth Day of July 1979

[SEAL]

Attest:

*Attesting Officer*

LUTRELLE F. PARKER
*Acting Commissioner of Patents and Trademarks*